United States Patent
Roudebush

[11] Patent Number: 6,158,749
[45] Date of Patent: Dec. 12, 2000

[54] STEP STOOL AND DOLLY APPARATUS

[75] Inventor: H. Richard Roudebush, Indianapolis, Ind.

[73] Assignee: Cosco Management, Inc., Wilmington, Del.

[21] Appl. No.: 09/160,951

[22] Filed: Sep. 25, 1998

Related U.S. Application Data

[60] Provisional application No. 60/060,025, Sep. 25, 1997.

[51] Int. Cl.[7] ...................................................... B62B 1/00
[52] U.S. Cl. .................................... 280/47.16; 280/47.18; 280/47.2; 280/47.28; 280/47.29; 182/16; 182/20
[58] Field of Search ................................ 280/47.28, 30, 280/47.16, 47.2, 47.27, 47.18, 47.29, 654, 649; 182/16, 20

[56] References Cited

U.S. PATENT DOCUMENTS

| | | |
|---|---|---|
| 466,899 | 1/1892 | Bourell . |
| 680,402 | 8/1901 | Van Court . |
| 867,754 | 10/1907 | Randall . |
| 1,221,579 | 4/1917 | Olds . |
| 1,672,717 | 6/1928 | Gentner . |
| 2,560,342 | 7/1951 | Hanson . |
| 2,843,393 | 7/1958 | Dahlander, Sr. . |
| 2,980,200 | 4/1961 | Kibby . |
| 3,104,889 | 9/1963 | Branch, Jr. . |
| 3,430,972 | 3/1969 | Fiedler . |
| 3,954,155 | 5/1976 | Guidara . |
| 4,235,449 | 11/1980 | Tarran . |
| 4,253,546 | 3/1981 | Uchida . |
| 4,258,826 | 3/1981 | Murray . |
| 4,362,307 | 12/1982 | Nakatani ................................... 280/30 |
| 4,428,456 | 1/1984 | Rohde . |
| 4,448,282 | 5/1984 | Giezendanner . |
| 4,456,094 | 6/1984 | Brander . |
| 4,471,969 | 9/1984 | Zabala et al. . |
| 4,494,626 | 1/1985 | Ast . |
| 4,934,485 | 6/1990 | Purkapile . |
| 4,934,718 | 6/1990 | Voegele . |
| 5,086,872 | 2/1992 | Lin . |
| 5,382,032 | 1/1995 | Wilson . |
| 5,464,244 | 11/1995 | Tsai ................................... 280/47.18 X |
| 5,468,005 | 11/1995 | Yang ................................ 280/47.29 X |
| 5,549,317 | 8/1996 | Dunkle ............................. 280/47.28 X |
| 5,630,601 | 5/1997 | Braucke et al. .................. 280/47.29 X |
| 5,738,480 | 4/1998 | Butzen ............................. 280/47.29 X |
| 5,803,471 | 9/1998 | DeMars et al. .................. 280/47.29 X |
| 5,836,595 | 11/1998 | Brice . |
| 5,941,543 | 8/1999 | Kazmark ............................... 280/47.29 |
| 5,984,327 | 11/1999 | Hsich et al. ..................... 280/47.27 X |

*Primary Examiner*—Lanna Mai
*Assistant Examiner*—Toan To
*Attorney, Agent, or Firm*—Barnes & Thornburg

[57] ABSTRACT

A step stool having a front frame member having a bottom end and a rear frame member having a bottom end coupled to the front frame member for pivotable movement about a frame pivot axis between an opened position in which the bottom end of the front frame member is spaced apart from the bottom end of the rear frame member and a collapsed position in which the bottom ends of the front and rear frame members are positioned to lie adjacent to one another and a leg cap including a flange and a flange support fixture coupled to the bottom end of the front frame member to support the flange in a predetermined position relative to the front frame member. A wheel coupled to the flange to rotate about a wheel axis and a floor pad coupled to the leg cap and adapted to rest on a floor underlying the frame and support the wheel in an elevated position above the floor upon movement of the front and rear frame members to the opened position. A dolly plate coupled to the leg cap for pivotable movement relative to the floor pad about a plate pivot axis between a storage position along side the rear frame member and a use position extending away from the rear frame member.

28 Claims, 6 Drawing Sheets

STEP STOOL AND DOLLY APPARATUS

This claims priority under 35 U.S.C. § 119(e) to U.S. provisional application Ser. No. 60/060,025 filed Sep. 25, 1997.

BACKGROUND AND SUMMARY OF THE INVENTION

The present invention relates to a step stool, and particularly, to a folding step stool having a frame that folds between an opened use position and a closed storage position. More particularly, the present invention relates to a folding step stool that is readily convertible into a hand truck structure.

Step stools have a frame and one or more steps that individuals use for elevation when reaching for objects. Individuals also use step stools as a seat for sitting. Step stool frames are often foldable for ease of storage while the step stool is not being used. Some step stools are also designed to be used as hand truck apparatus for moving objects over a floor.

According to the present invention, a step stool includes a frame having front and rear frame members coupled together for movement between an opened position and a collapsed position, a top step coupled to the front frame member for movement between step and support positions, and a dolly unit coupled to the front frame for movement between storage and use positions. The dolly unit includes wheels and a dolly plate positioned to lie between the wheels. The dolly plate folds relative to the front frame member between a storage position in which the dolly plate extends generally parallel to the front frame member and a use position in which the dolly plate extends outwardly from the front frame member. Given the relative position of the top step and the dolly unit, an individual can easily transition the steep stool from the opened position of the frame to the use position of the dolly unit without having to walk around the step stool or manipulate a number of different mechanisms.

In preferred embodiments, the rear frame member includes rear legs and a strut extending between the rear legs. In addition, the dolly plate includes a strut portion coupled to the front frame member and a support portion extending from the strut portion for supporting objects placed thereon by an individual. When the dolly plate is folded from the storage position to the use position, the strut portion folds over the strut of the rear frame member to secure the rear frame member to the dolly unit. Thus, the rear frame member remains in a generally stationary position when an individual tilts the frame on the wheels to transport objects.

Additional features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2, 3:
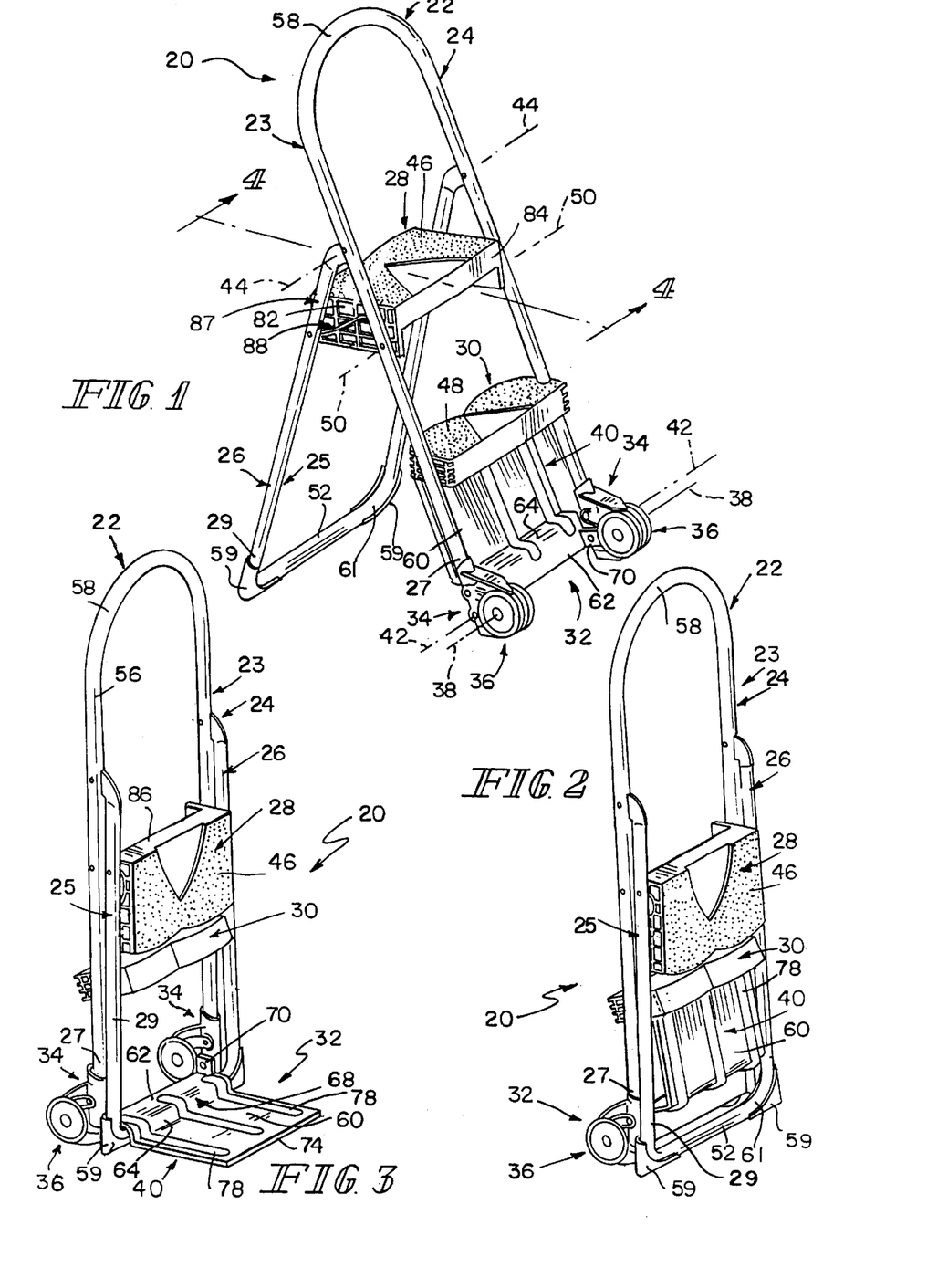
FIG. 1 is a perspective view of a step stool in accordance with the present invention showing a frame including front and rear frame members in an opened position, the rear frame member including rear legs and a strut extending between the rear legs, a top step having an upwardly facing step surface supported in a generally horizontal orientation by the front and rear frame members, a bottom step coupled to the front frame member beneath the top step, and a dolly unit coupled to the front frame member beneath the bottom step.
FIG. 2 is a perspective view of the step stool of FIG. 1 showing the front and rear frame members of the step stool in a collapsed position, the top step pivoted to a generally vertical orientation having the step surface substantially parallel with the front and rear frame members, and the dolly unit folded to a storage position.
FIG. 3 is a perspective view of the step stool of FIG. 2 showing the dolly unit including a dolly plate pivoted to a use position and showing the dolly plate having a strut portion configured to secure the strut of the rear frame member to the front frame member and a support portion extending from the strut portion.

A step stool 20 includes a frame 22 having a front frame member 23, a rear frame member 25, a top step 28 coupled to front and rear frame members 23, 25, a bottom step 30 coupled to front frame member 23, and a pivotable dolly unit 32 coupled to front frame member 23 as shown in FIG. 1. Step stool 20 is foldable between a step stool configuration in which dolly unit 32 is in a storage position, shown in FIG. 1, and a dolly configuration in which dolly unit 32 is in a use position, shown in FIG. 3. When step stool 20 is moved from the step stool configuration to the dolly configuration, top step 28 folds automatically from a step position to a support position to provide a support for objects carried on dolly unit 32. An individual can easily transition step stool 20 between the step stool and dolly configurations while standing in front of the step stool without having to walk around the step stool or manipulate a number of different mechanisms.

Figures 4, 5:
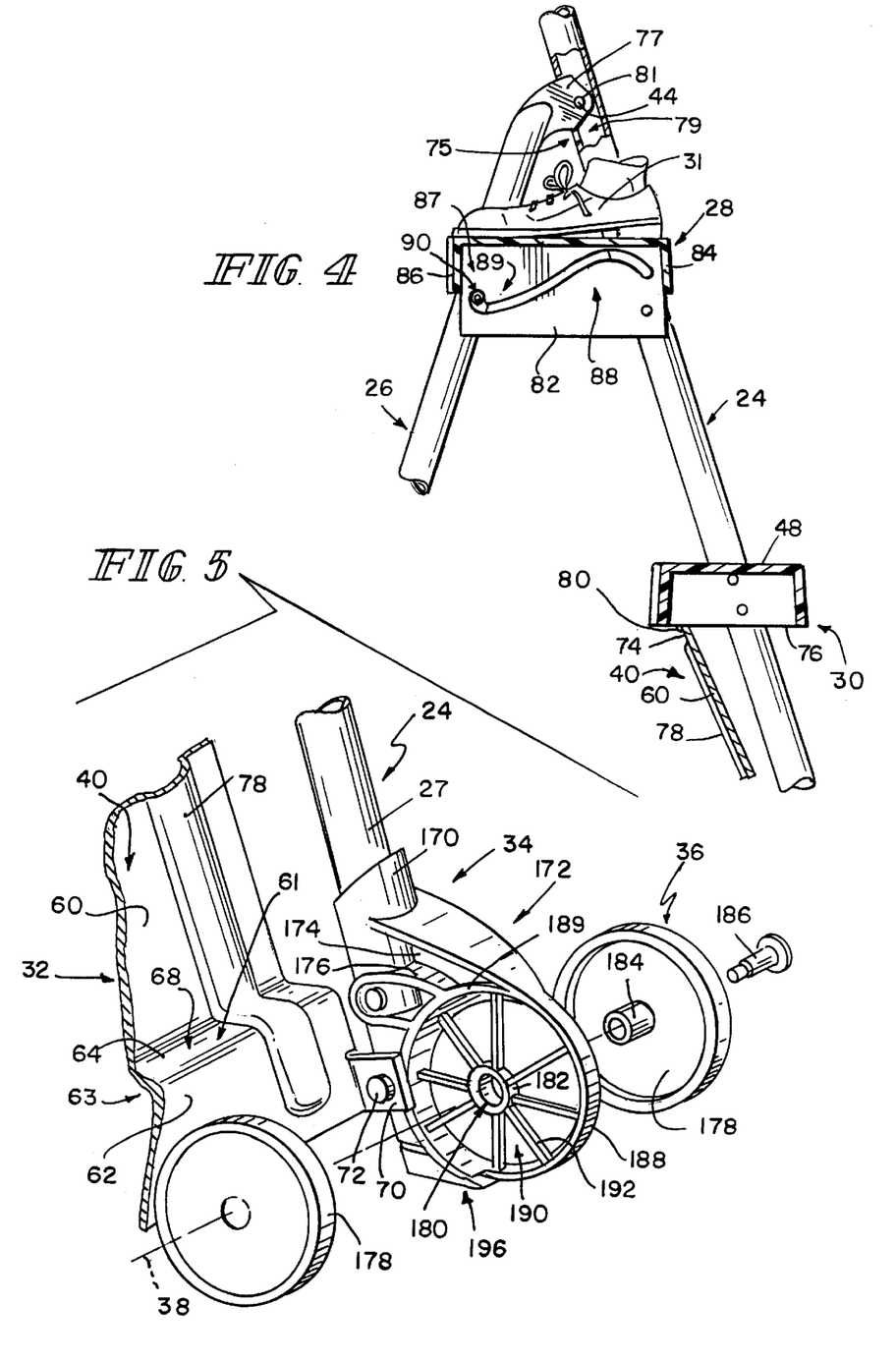
FIG. 4 is a sectional view taken along line 4—4 of FIG. 1, with portions broken away, showing the rear frame member having a top flattened end arranged to extend into an interior region of the front frame member, a guide unit coupled to the top step and including a side wall formed with a curved guide having a hook, and a follower coupled to the rear frame member and received in the hook of the curved guide when the top step is supported in the generally horizontal orientation.
FIG. 5 is an exploded perspective view of the dolly unit of FIG. 1, with portions broken away, showing the dolly unit including a leg cap having a flange support fixture coupled to a bottom end of the respective front frame member and a flange extending from the flange support fixture, and a wheel coupled to the flange, and the strut portion of the dolly plate is coupled to the fixture of the leg cap.

Referring now to FIG. 1, front frame member 23 includes opposite front legs 24, each having a bottom end 27, and a curved top portion 58 interconnecting front legs 24. Rear frame member 25 includes opposite rear legs 26, each having a bottom end 29, and a cross strut 52 extending between bottom ends 29. Front and rear frame members 23, 25 are pivotably coupled to one another for movement about a frame pivot axis 44. When step stool 20 is in the opened position, bottom ends 27 of front legs 24 are spaced apart from a bottom ends 29 of rear legs 26 and top step 28 is situated in the step position capable of supporting an individual's foot 31 as shown in FIGS. 1 and 4. When, however, step stool 20 is in the collapsed position, bottom ends 27, 29 lie adjacent to one another and top step 28 folds to the support position substantially parallel to front legs 24 as shown in FIGS. 2 and 3.

Figure 9:
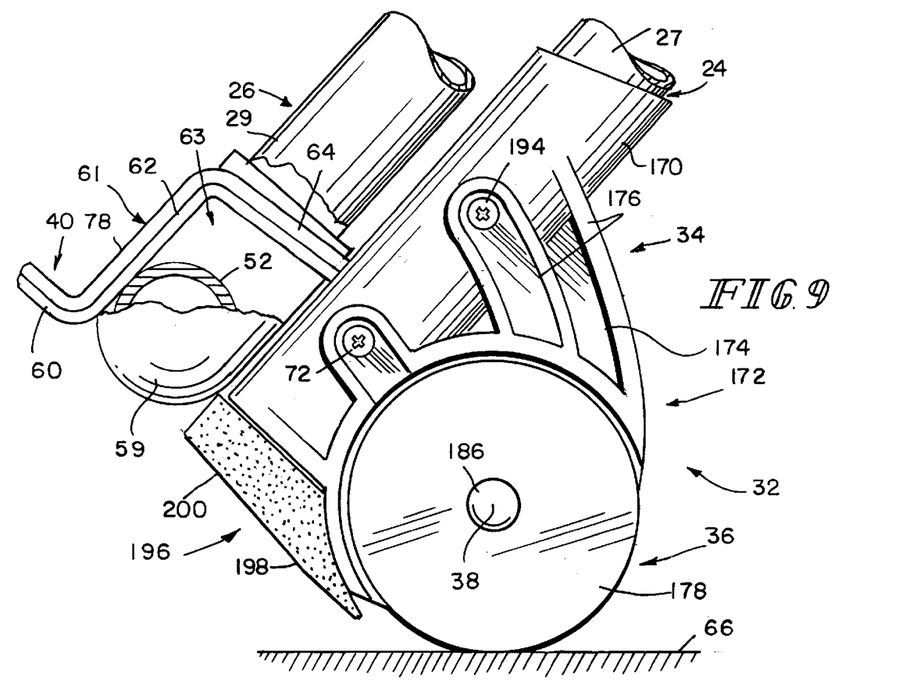
FIG. 9 is a view similar to FIG. 8 showing the front frame member moved to a tilted position lifting the floor pad off of the floor and contacting the wheel with the floor so that the step stool can be rolled along the floor.

Referring now to FIGS. 4 and 5, dolly unit 32 is coupled to front legs 24 beneath bottom step 30. Dolly unit 32 includes a pair of leg caps 34, wheels 36 coupled to leg caps 34 for rotation about a wheel axis 38, and a dolly plate 40 coupled to leg cap 34 for pivoting movement about a plate pivot axis 42. As shown in FIG. 5, dolly plate 40 includes a support portion 60 and a strut portion 61 having a first recess portion 62 that is substantially parallel with and offset from support portion 60 and a second recess portion 64 that is substantially perpendicular with both support portion 60 and first recess portion 62 as shown best in FIG. 3. Second recess portion 64 cooperates with first recess portion 62 to provide dolly plate 40 with a stepped or recessed configuration defining a recess 63 that is step-shaped as shown in FIGS. 5 and 9. When front and rear frame members 23, 25 are in the collapsed position and dolly plate 40 is moved to the use position, as shown in FIGS. 3 and 9, first recess portion 62 extends above cross strut 52 and second recess portion 64 extends downwardly from first recess portion 62 adjacent to cross strut 52 so that rear frame member 25 is secured in the collapsed position adjacent to front frame member 23 by strut portion 61. Thus, recess 63 is adapted to receive strut 52 so that strut portion 61 secures strut 52 from movement relative front frame member 23 while dolly plate 40 is in the use position.

Figure 6A:
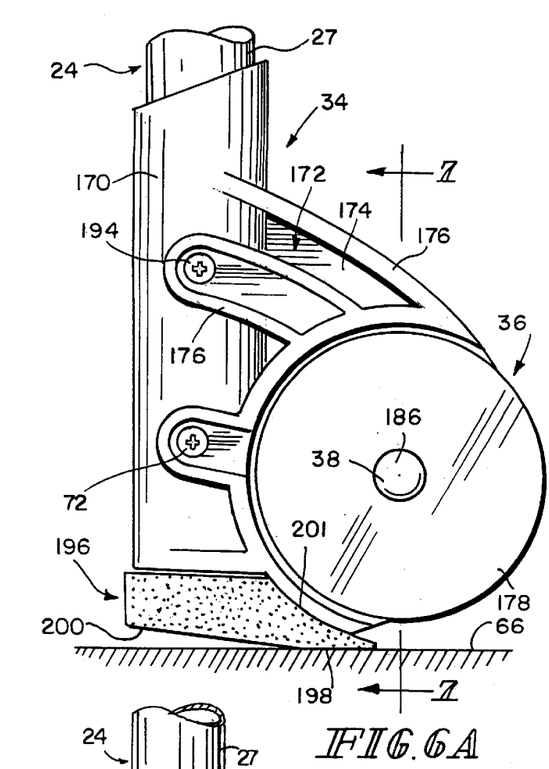
FIG. 6A is side elevation view of the dolly unit of FIG. 4 showing the leg cap and the front frame member in a generally vertical position, the dolly unit including a floor pad coupled to the leg cap and having a first bottom surface that engages a floor, and the leg cap arranged to support the wheels in spaced-apart relation with the floor.
Figure 6B:
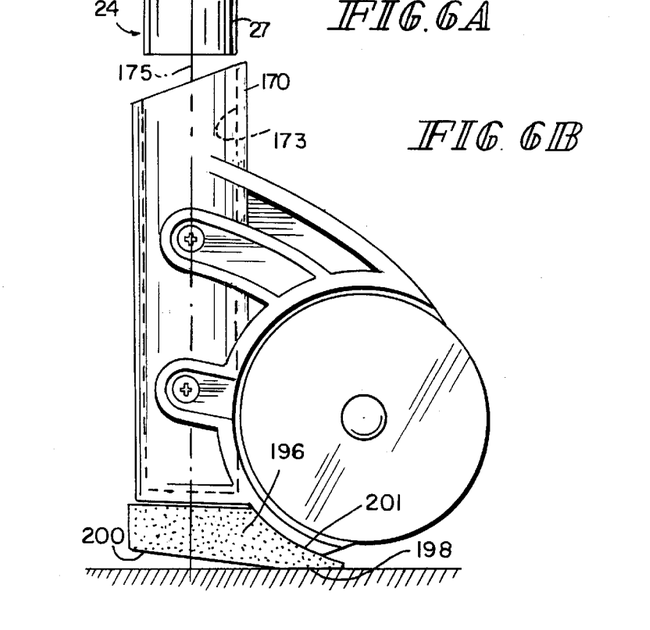
FIG. 6B is the side elevation view of FIG. 6A showing the socket of the support fixture therein with the bottom end of the front leg separated therefrom.
Figure 8:
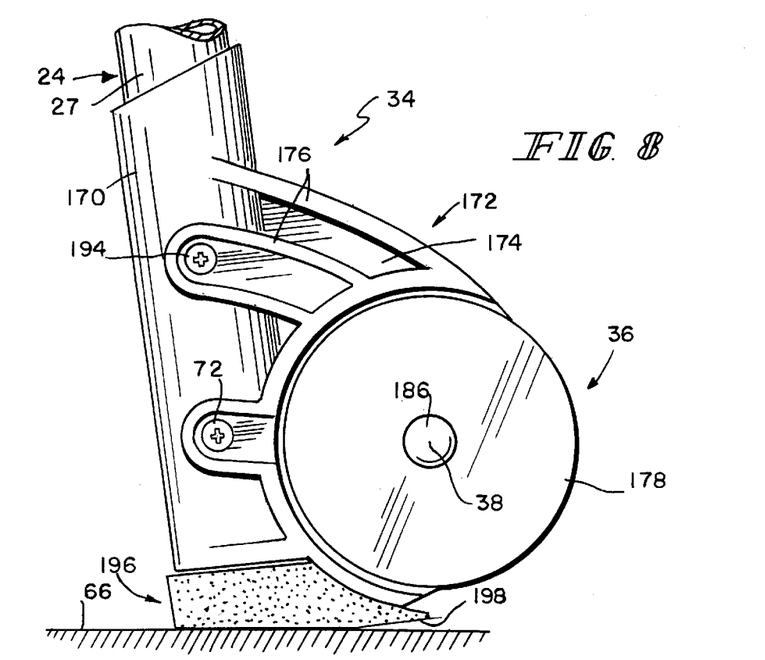
FIG. 8 is a view similar to FIG. 6 showing the frame in the opened position, the floor pad having a second bottom surface that engages the floor when the front frame member is in the opened position, and the leg cap arranged to support the wheel in spaced-apart relation with the floor.

After front and rear frames 23, 25 are moved to the collapsed position and dolly plate 40 is moved to the use position so that step stool 20 is in the dolly configuration shown in FIG. 3, objects (not shown) are placed on support portion 60 and dolly 20 is used to transport the objects over a floor 66, shown, for example, in FIGS. 6, 8 and 9. Support portion 60 and second recess portion 64 provide dolly plate 40 with a corner 67 against which boxes or box-shaped objects carried by dolly plate 40 can flushly nest to stabilize the object during transport. In addition, step surface 48 of top step 28 is substantially coplanar with a cargo-abutment surface 68 of second step recess portion 64 of dolly plate 40 so that objects of suitable height can engage both cargo-abutment surface 68 and step surface 48.

Dolly plate 40 includes a pair of tabs 70 that extend away from first recess portion 62 of strut portion 61 as shown in FIGS. 1, 3, and 5. Each tab 70 is coupled to the respective leg cap 34 by a pivot pin 72 at plate pivot axis 42. Dolly plate 40 further includes three raised ribs 78 each of which follow the stepped contour of support portion 60 and strut recess 61. Ribs 78 enhance the ability of dolly plate 40 to grip the object carried on dolly plate 40. For example, if the object being carried is a corrugated cardboard box, ribs 78 indent into the portion of the box engaging ribs 78 so that the box resists sliding off of dolly plate 40 laterally during transport.

Dolly plate 40 has a distal end 74 that is spaced apart from tabs 70 as shown in FIGS. 3 and 4. Bottom step 30 has an undersurface 76 and a detent 80 appended to undersurface 76, as shown in FIG. 4. When dolly plate 40 is moved from the use position in which dolly plate 40 is oriented at a first angle relative to front frame member 23 to the storage position in which dolly plate 40 is oriented at a second angle relative to front frame member 23, distal end 74 of dolly plate 40 snaps past detent 80. While dolly plate 40 is in the storage position, dolly plate 40 is acted upon by gravity to move distal end 74 into engagement with detent 80. Engagement between distal end 74 and detent 80 prevents dolly plate 40 from falling into the use position. Application of a sufficient amount of force to dolly plate 40 causes distal end 74 to snap past detent 80 so that dolly plate 40 pivots about plate pivot axis 42 from the storage position into the use position. For example, a user standing in front of step stool 20 may use his or her foot to apply such a force to dolly plate 40. Dolly plate 40 is positioned to lie within the space defined between front and rear legs 24, 26 when front and rear frame members 23, 25 are in the collapsed position and dolly plate 40 is in the storage position.

Dolly unit 32 includes pair of leg caps 34, wheels 36 coupled to respective leg caps 34 for rotation about wheel axis 38, and dolly plate 40 coupled to both leg caps 34 for pivoting movement about plate pivot axis 42 as previously described. The description below of a single leg cap 34 and wheel 36 is descriptive of both leg caps 34 and wheels 36 unless specifically noted otherwise.

Leg caps 34 of dolly unit 32 include a flange support fixture 170 and a flange 172 arranged to extend from flange support fixture 170 as shown in FIGS. 5–9. Flange support fixture 170 is shaped as a cylindrical wall to include a socket indicated by the dotted line 173 (see FIG. 6B) which defines the cylindrical internal cavity of the support fixture 170 that receives the bottom end 27 of front leg 24 to support flange 172 in a predetermined position relative to front frame member 23. Flange 172 includes a vertical wall 174 and a set of stabilizing ribs 176 arranged to extend away from vertical wall 174 in perpendicular relation therewith to provide rigidity to wall 174. Leg cap 34 is molded as a single integral piece from an engineering plastics material.

Figure 7:
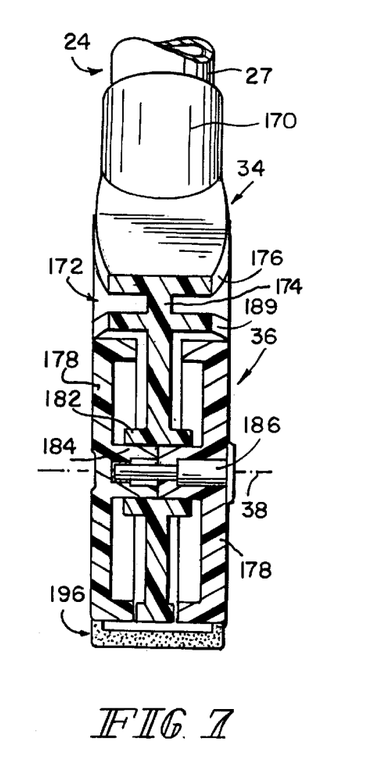
FIG. 7 is a sectional view taken along line 7—7 of FIG. 6 showing the wheel coupled to the flange by an axle pin.

Wheel 36 includes two wheel members 178 that couple to flange 172 as shown in FIGS. 5 and 7. Vertical wall 174 of flange 172 is positioned to lie between respective wheel members 178 and is formed to include an aperture 180. A bearing cylinder 182 is appended to flange 172 at aperture 180 and each wheel member 178 includes a cylindrical axle boss 184 received in aperture 180. Dolly unit 32 includes an axle pin 186 that couples wheel members 178 together so that axle bosses 184 abut one another within bearing cylinder 182 as shown in FIG. 7. Contact between bearing cylinder 182 and axle bosses 184 provides rotative bearing engagement between wheel 36 and flange 172. Leg cap 34 includes a circular rim 188 having a flared portion 189 that cooperates with vertical wall 174 to provide a wheel well 190 for each wheel member 178. Leg cap 34 also includes a plurality of stabilizing spokes 192 appended to vertical wall 174 and arrange to extend radially between bearing cylinder 182 and circular rim 188 to provide added rigidity to flange 172 as shown in FIG. 5.

Dolly plate 40 includes tabs 70 that are coupled to leg caps 34 by respective pivot pins 72 as previously described. Each pivot pin 72 extends through the respective leg cap 34 and also through each respective front leg 24 to couple each leg cap 34 to the respective front leg 24. Dolly unit 32 also includes a pair of additional pins 194 above respective pivot pins 72. Each additional pin 194 extends through the respective leg cap 34 and also through each respective front leg 24 to further couple each leg cap 34 to the front frame member 23.

Dolly unit 32 includes a pair of floor pads 196, each of which are coupled to the bottoms of respective leg caps 34 as shown in FIGS. 5–9. The description below of floor pad 196 associated with one of leg caps 34 is descriptive of both floor pads 196 unless specifically noted otherwise.

Floor pad 196 includes a first bottom surface 198 and a second bottom surface 200 that is inclined with respect to first bottom surface 198 as shown best in FIG. 6 and FIG. 9. A center axis 175 of the flange support fixture 170 and front leg 24 is shown with the first bottom surface 198 extending perpendicular and offset from the central axis and under the wheel 178 and with a third top surface 201, concentric with and below the wheel 178. When step stool 20 is in the flat-fold configuration and front and rear legs 24, 26 are generally vertically oriented, as shown in FIG. 2, first bottom surface 198 engages floor 66, second bottom surface 200 is spaced apart from floor 66, and wheel 36 is spaced apart from floor 66 as shown in FIG. 6. When step stool 20 is in the step stool configuration, shown in FIG. 1, second bottom surface 200 engages floor 66, first bottom surface 198 is spaced apart from floor 66, and wheel 36 is spaced apart from floor 66 as shown in FIG. 8. When step stool 20 is in the dolly configuration, shown in FIG. 3, curved top portion 58 is grasped and dolly 20 is tipped relative to floor 66 to bring wheels 36 into contact with floor 66 so that the cargo carried by dolly 20 can be transported over floor 66. When dolly 20 is tipped in this manner, floor pad 196 is spaced apart from floor 66 as shown in FIG. 9.

Step stool 20 can be moved between the step stool configuration in which frame 22 is in the opened position and dolly plate 40 is in the storage position as shown in FIG. 1, a flat-fold storage configuration in which frame 22 is in the collapsed position and dolly plate 40 is in the storage position as shown in FIG. 2, and the dolly configuration in which frame 22 is in the collapsed position and dolly plate 40 is in the use position as shown in FIG. 3. Frame pivot axis 44, step pivot axis 50, and plate pivot axis 42 are substantially coplanar. In addition, each front leg 24 is formed to include a slot 75 and each rear leg 26 includes a flattened end 77 that extends through slot 75 into an interior region 79 of the respective front leg 24 as shown in FIG. 4. A pivot pin 81 couples each flattened end 77 to the respective front leg 24 at frame pivot axis 44.

Top step 28 includes a step surface 46 and bottom step 30 includes a step surface 48. Top step 28 is coupled to front leg 24 for pivoting movement about step pivot axis 50. When front and rear frame members 23, 25 are in the opened position, top step 28 is in the step position at a first angle relative to the front frame member 23 in which step surface 46 faces upwardly and is substantially parallel with step surface 48 of bottom step 30. When front and rear frame members 23, 25 are in the collapsed position, top step 28 is in the support position at a second angle relative to front frame member 23 in which step surface 46 faces away from front and rear frame members 23, 25 in substantially parallel relation therewith.

Top step 28 is coupled to rear leg 26 for sliding and pivoting movement as previously described. Top step 28 includes a front wall 84 and a rear wall 86 as shown in FIG. 4. Walls 84, 86 all extend away from step surface 46 in the same direction. In addition, walls 84, 86 are all substantially perpendicular with step surface 46.

Step stool 20 includes guide units 87 that guide movement of top step 28 between the step and support positions. Guide units 87 include side walls 82 coupled to top step 28, guides 89 formed in side walls 82, and a pair of followers 90 that are coupled to respective rear legs 26. Guides 89 include a pair of follower guide slots 88 formed in side walls 82. Each follower 90 extends into respective follower guide slot 88 and is directed by respective follower guide slot 90 in a smooth S-shaped path as top step 28 moves between the step and support positions. Guide units 87 are described in a U.S. Patent Application titled STEP STOOL MECHANISM, filed Sep. 25, 1998, by Bedja et al. which is hereby incorporated by reference.

Bottom step 30 is coupled to front leg 24 so that step surface 46 maintains a constant orientation relative to front leg 24 as front and rear frame members 23, 25 are moved between the opened and collapsed positions. Although the step stool 20, shown in FIGS. 1–3, includes only one bottom step 30 beneath top step 28, it is within the scope of the disclosure for additional steps that are similar to bottom step 28 to be coupled to front leg 24 beneath top step 28. It is also within the scope of the disclosure for one or more steps that pivot relative to front leg 24 to be coupled to front leg 24 beneath top step 28. Step stool 20 also includes a support foot 59 at each elbow portion 61 of rear frame member 25 to provide step stool 20 with added stability when rear frame member 25 is in the opened position.

Figure 10:
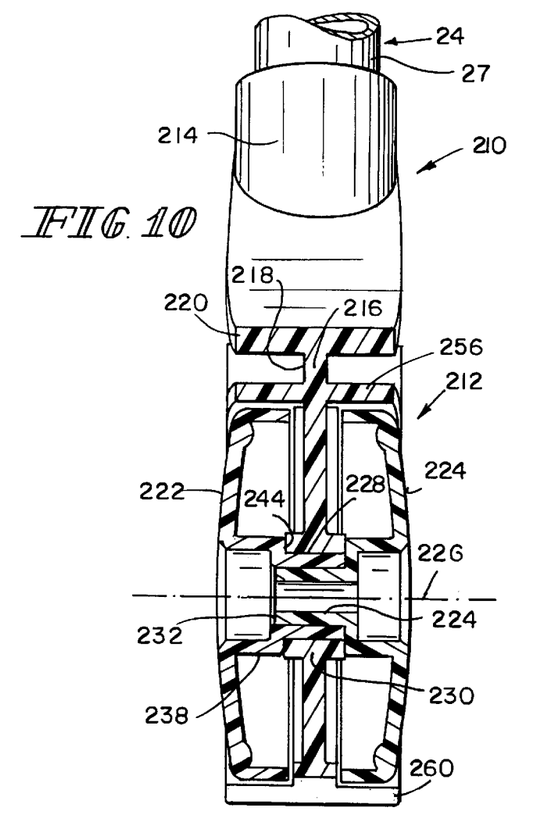
FIG. 10 is a sectional view similar to FIG. 7 of a leg cap and wheel in accordance with the another embodiment of the present invention showing the wheel having first and second wheel members positioned to lie on opposite sides of a flange of the leg cap, the first wheel member of the wheel having an axle boss arranged in rotative bearing engagement with a bearing cylinder of the flange, the second wheel member of the wheel having an axle boss that nests within a bore of the axle boss of the first wheel member, and a pin and washer that hold the wheel members together.
Figures 12, 13:
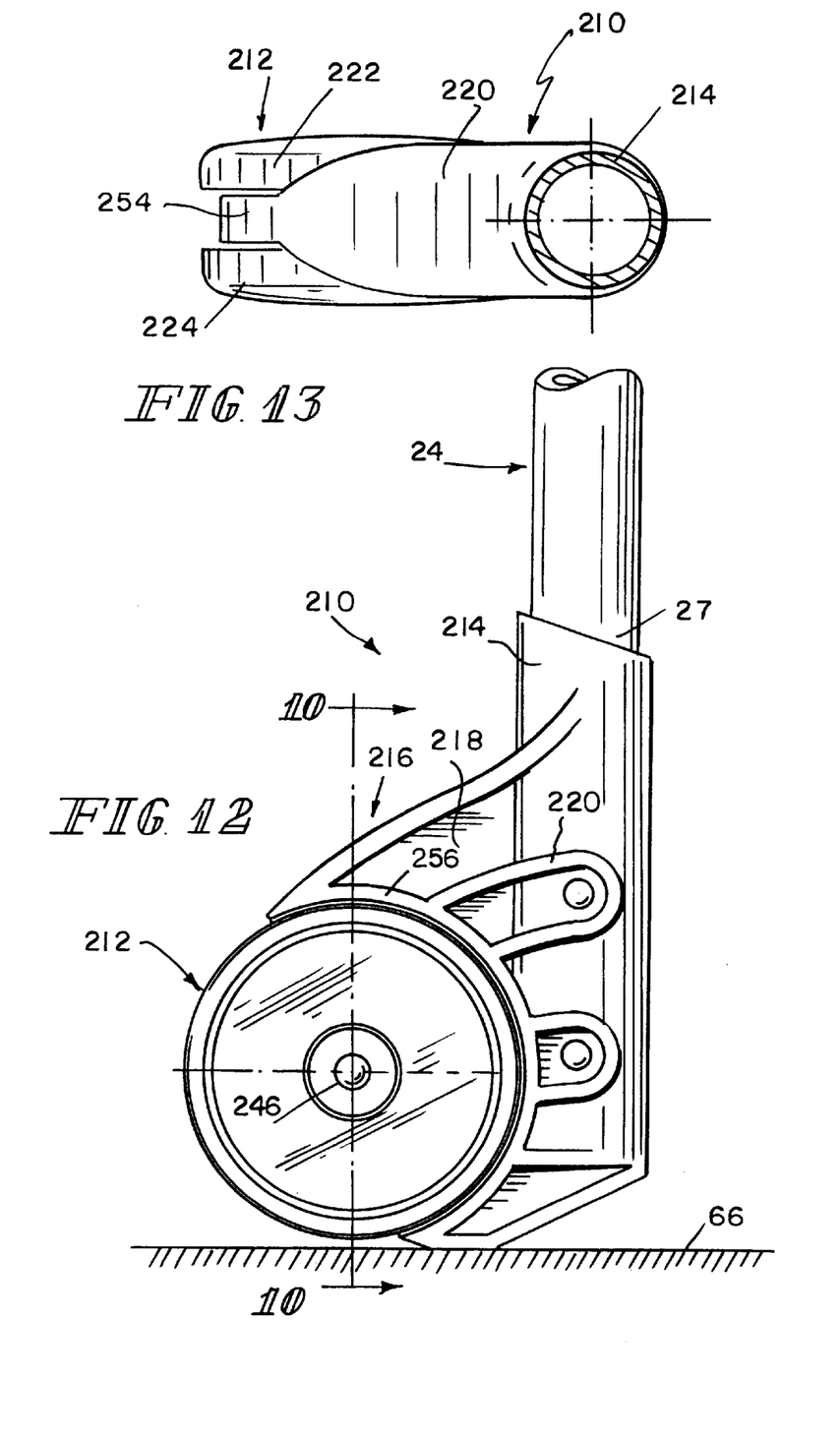
FIG. 12 is a view similar to FIG. 6 of the dolly unit including the leg cap and wheel of FIGS. 10 and 11 showing the wheel coupled to the leg cap.
FIG. 13 is a top plan view of the dolly unit of FIG. 10.

A leg cap 210 and wheel 212 which are similar to leg cap 34 and wheel 36 is shown in FIG. 10. Leg cap 210 includes a flange support fixture 214 and a flange 216 arranged to extend from flange support fixture 214 as shown best in FIG. 12. Flange support fixture 214 is formed to include a socket (not shown) that receives bottom end 27 of front leg 24. Flange 216 includes a vertical wall 218 and a set of stabilizing ribs 220 arranged to extend away from vertical wall 218 in perpendicular relation therewith to provide rigidity to wall 218. Leg cap 210 is molded as a single integral piece from an engineering plastics material.

Figure 11:
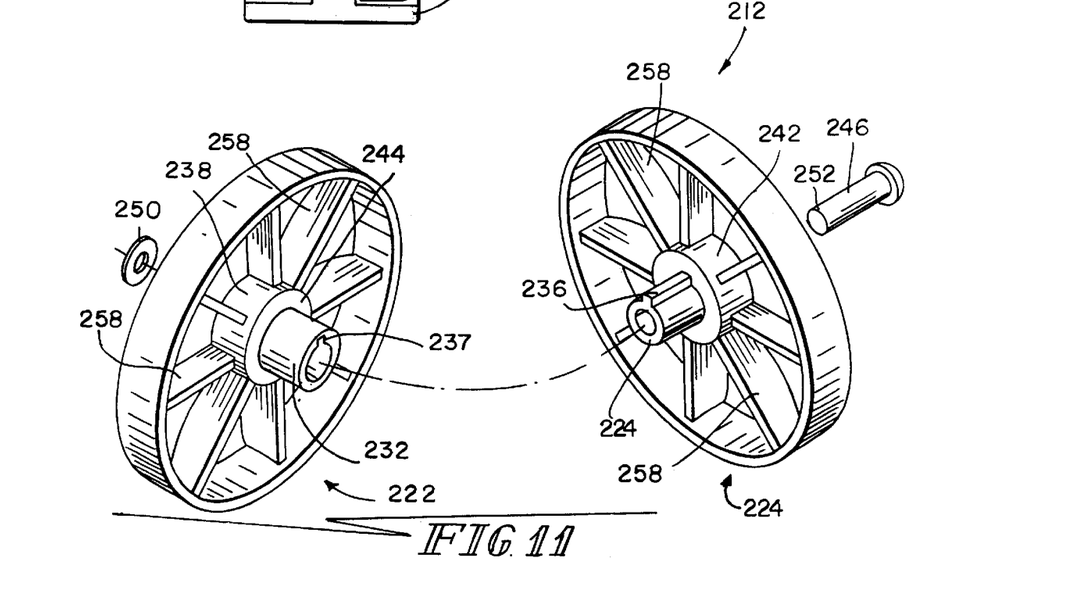
FIG. 11 is a perspective view of the first and second wheel members of FIG. 10 showing a slot formed in the axle boss of the first wheel member and a spline appended to the axle boss of the second wheel member and configured to mate with the slot formed in the axle boss of the first wheel member to key the wheel members together.

Wheel 212 includes a first wheel member 222 and a second wheel member 224, each of which couple to flange 216 for rotation about a wheel axis 226 as shown in FIG. 10. Vertical wall 218 of flange 216 is positioned to lie between first and second wheel members 222, 224 and is formed to include an aperture 228. A bearing cylinder 230 is appended to flange 216 at aperture 228 as shown in FIG. 10. First wheel member 222 includes a large cylindrical axle boss 232 received in aperture 228 and arranged in rotative bearing engagement with bearing cylinder 230. Second wheel member 224 includes a small cylindrical axle boss 234 that nests within a bore of large cylindrical axle boss 232. Second wheel member 224 also includes a spline 236 appended to small cylindrical axle boss 234 as shown in FIG. 11. Spline 236 is configured to mate with a slot 237 formed in the bore of large cylindrical axle boss 232 to key axle bosses 232, 234 together so that first and second wheel members 222, 224 are interlocked for simultaneous rotation.

First wheel member 222 includes a center hub 238 and a shoulder 240 that interconnects hub 238 with large cylindrical axle boss 232. Second wheel member 224 includes a center hub 242 and a shoulder 244 that interconnects hub 242 with small cylindrical axle boss 234 as shown in FIG. 10. A rivet pin 246 is inserted through the bore of small cylindrical axle boss 234 so that a head 248 of rivet pin 246 engages shoulder 244 of wheel member 224. A washer 250 is mounted on an end 252 of rivet pin 246 arranged to extend beyond axle boss 234. End 252 is deformed or smashed by a heading operation, for example, so that washer 250 is retained on rivet pin 246 between end 252 and shoulder 240 of wheel member 222. Thus, rivet pin 246 and washer 250 hold first and second wheel members 222, 224 together.

Bearing cylinder 230 is trapped between shoulder 240 of wheel member 222 and shoulder 244 of wheel member 224. In addition, large cylindrical axle boss 232 is trapped between shoulder 244 of wheel member 224 and washer 250. Washer 250 and head 248 of rivet pin 246 abut respective shoulders 240, 244 and the axial end of large cylindrical axle boss 232 abuts shoulder 244 of wheel member 224 so that axial play between wheel members 222, 224 is eliminated. Contact between shoulders 240, 242 and bearing cylinder 230 limits the amount by which wheel 212 moves axially relative to flange 216. In addition, contact between bearing cylinder 230 and large cylindrical axle boss 232 provides rotative bearing engagement between wheel members 222, 224 and flange 216.

Leg cap 210 includes a circular rim 254 having a flared portion 256 that cooperates with vertical wall 218 to provide wheel wells for respective wheel members 222, 224. Each wheel member 222, 224 includes a plurality of stabilizing spokes 258 arranged to extend radially outwardly from respective center hubs 238, 242 to provide added rigidity to wheel members 222, 224 as shown in FIG. 11. In addition, a plurality of stabilizing spokes (not shown), similar to stabilizing spokes 192 of leg cap 34, are appended to vertical wall 218 and extend radially between bearing cylinder 230 and circular rim 254 to provide added rigidity to flange 216. A floor pad 260, similar to floor pad 196 of dolly unit 32, is coupled to the bottom of leg cap 210 as shown in FIG. 10.

Although the invention has been described in detail with reference to certain preferred embodiments, variations and modifications exist within the scope and spirit of the invention as described and as defined in the following claims.

What is claimed is:

1. A step stool comprising a frame including a front frame member having a bottom end and a rear frame member having a bottom end and the rear frame member coupled to the front frame member for pivotable movement about a frame pivot axis between an opened position in which the bottom end of the front frame member is spaced apart from the bottom end of the rear frame member and a collapsed position in which the bottom ends of the front and rear frame members are positioned to lie adjacent to one another, a leg cap including a flange and a flange support fixture coupled to the bottom end of the front frame member to support the flange in a predetermined position relative to the front frame member, a wheel moveable along a floor and coupled to the flange to rotate about a wheel axis, a floor pad coupled to the leg cap and adapted to rest on a floor underlying the frame and support the wheel in an elevated position above the floor in both a vertically collapsed position and the opened position, while allowing the wheel to move along the floor when the frame is tilted in its collapsed position, and a dolly plate coupled to the leg cap for pivotable movement relative to the floor pad about a plate pivot axis between a storage position along side the rear frame member and a use position extending away from the rear frame member.

2. The step stool of claim 1, wherein the floor pad is coupled to the flange support fixture of the leg cap.

3. The step stool of claim 2, wherein the floor pad is coupled to the flange of the leg cap.

4. The step stool of claim 1, wherein the dolly plate includes a pair of tabs, each tab is positioned to couple the dolly plate to the flange support fixture of the leg cap.

5. The step stool of claim 1, wherein the dolly plate is formed to include a recess formed to receive the rear frame member when the frame is in the collapsed position and the dolly plate is in the use position.

6. The step stool of claim 5, wherein the dolly plate includes first support portion adapted to carry an item positioned to lie on the dolly plate and a step portion defining the recess.

7. The step stool of claim 1, wherein the dolly plate includes a support portion adapted to carry an item positioned to lie on the dolly plate and a plurality of ribs.

8. The step stool of claim 7, wherein the ribs extend upwardly from the support portion.

9. A step stool comprising a structure including a front frame member having a bottom end and a rear frame member having a bottom end coupled to the front frame member for pivotable movement about a frame pivot axis between an opened position in which the bottom end of the front frame member is spaced apart from the bottom end of the rear frame member and a collapsed position in which the bottom ends of the front and rear frame members are positioned to lie adjacent to one another, the structure being movable between a substantially upright position relative to a floor underlying the structure while in the collapsed position and a leaning position relative to the floor while in the collapsed position, a wheel coupled to the structure to rotate about a wheel axis, the wheel engaging the floor while the structure is in the leaning position, a dolly plate coupled to the structure to extend away from the structure, the dolly plate cooperating with the floor to define a first included angle while the structure is in the upright position and a second included angle while the structure is in the leaning position, the second included angle being greater than the first included angle, and a floor pad coupled to the structure and including a first bottom surface adapted to rest on the floor and support the wheel in an elevated position above the floor upon movement of the structure to the opened position and a second bottom surface adapted to rest on the floor and support the wheel in an elevated position above the floor upon movement of the structure to the upright position, the first and second bottom surfaces being spaced apart from the floor upon movement of the structure to the leaning position to permit the wheel to engage the floor.

10. The step stool of claim 9, wherein the front leg has a central axis and the floor pad extends generally perpendicular to the central axis.

11. The step stool of claim 9, wherein the front leg has a central axis and the floor pad is offset from the central axis.

12. The step stool of claim 9, wherein the first bottom surface defines a first plane, the second bottom surface defines a second plane, and the first and second planes intersect.

13. The step stool of claim 9, wherein the front leg has a central axis and the floor pad is positioned to lie between the central axis of the front leg and the wheel.

14. The step stool of claim 9, wherein the floor pad includes a first portion positioned to lie under the front leg and a second portion positioned to lie under the wheel.

15. The step stool of claim 14, wherein the first portion includes the first bottom surface and the second portion includes the second bottom surface.

16. The step stool of claim 9, wherein the floor pad includes a third surface that is generally concentric with the wheel.

17. The step stool of claim 16, wherein the third surface intersects the second bottom surface.

18. A step stool comprising a frame including a front frame member having a bottom end and a rear frame member having a bottom end and the rear frame member coupled to the front frame member for pivotable movement about a frame pivot axis between an opened position in which the bottom end of the front frame member is spaced apart from the bottom end of the rear frame member and a collapsed position in which the bottom ends of the front and rear frame members are positioned to lie adjacent to one another, a leg cap formed to include a socket sized to receive the bottom end of the front frame member, a wheel moveably coupled to the leg cap for rotation along a floor surface and about a wheel axis, and a floor pad coupled to the leg cap to raise the wheel above the floor surface in both the open and vertically collapsed positions and permit the wheel to contact and move along the floor surface upon tilting of the frame when in the collapsed position.

19. The step stool of claim 18, wherein the leg cap includes a flange and a flange support fixture formed to include the socket.

20. The step stool of claim 19 further comprising a pin, wherein the pin couples the leg cap to the front frame member.

21. The step stool of claim 20 further comprising another pin, wherein the pins are spaced apart from one another.

22. The step stool of claim 19, wherein the flange is formed to includes a plurality of ribs.

23. The step stool of claim 19, wherein flange includes a curved portion extending between the socket and the wheel.

24. The step stool of claim 19, wherein the flange includes a rib that is generally concentric with the wheel.

25. The step stool of claim 18 further comprising a floor pad coupled to the leg cap, wherein the floor pad includes a surface that is generally concentric with the wheel.

26. The step stool of claim 25, wherein leg cap includes a flange including a rib that is generally concentric with the wheel and the surface of the floor pad engages the rib.

27. The step stool of claim 25 further comprising a dolly plate coupled to the leg cap.

28. The step stool of claim 27, wherein the leg cap is formed to include a pivot pin and the dolly plate is coupled to the leg cap by the pivot pin.

\* \* \* \* \*